ized States Patent (12) United States Patent
Kato et al.

(10) Patent No.: US 9,361,043 B2
(45) Date of Patent: Jun. 7, 2016

(54) INFORMATION PROCESSING AND CONTROL SYSTEM FOR INTER PROCESSING APPARATUS CONTROL OF STORAGE DEVICES

(71) Applicant: Hitachi, Ltd., Tokyo (JP)

(72) Inventors: Koichiroh Kato, Tokyo (JP); Akihiro Umezawa, Tokyo (JP); Nobuo Yagi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/360,531

(22) PCT Filed: Dec. 26, 2012

(86) PCT No.: PCT/JP2012/083547
§ 371 (c)(1),
(2) Date: May 23, 2014

(87) PCT Pub. No.: WO2013/105433
PCT Pub. Date: Jul. 18, 2013

(65) Prior Publication Data
US 2014/0344534 A1 Nov. 20, 2014

(30) Foreign Application Priority Data

Jan. 13, 2012 (JP) ................................ 2012-004632

(51) Int. Cl.
*G06F 13/12* (2006.01)
*G06F 3/06* (2006.01)

(52) U.S. Cl.
CPC ............ *G06F 3/0658* (2013.01); *G06F 3/0604* (2013.01); *G06F 3/0614* (2013.01); *G06F 3/0673* (2013.01); *G06F 3/0676* (2013.01); *G06F 2003/0697* (2013.01)

(58) Field of Classification Search
CPC .............................. G06F 3/067; G06F 3/0605
USPC ........................................................ 710/62
See application file for complete search history.

(56) References Cited

U.S. PATENT DOCUMENTS

| 5,611,057 | A | 3/1997 | Pecone et al. |
| 5,668,943 | A | 9/1997 | Attanasio et al. |
| 2005/0182900 | A1 | 8/2005 | Matsunami et al. |
| 2006/0129585 | A1 | 6/2006 | Ishiki et al. |
| 2008/0244098 | A1* | 10/2008 | Oikawa et al. ............ 710/5 |
| 2009/0327798 | A1 | 12/2009 | D'Amato et al. |

FOREIGN PATENT DOCUMENTS

| EP | 0709779 A2 | 1/1996 |
| JP | 08-320768 A | 12/1996 |

(Continued)

OTHER PUBLICATIONS

EP Search Report, EP Application No. 12 86 5313, Jul. 16, 2015, 9 pages.

*Primary Examiner* — Titus Wong
(74) *Attorney, Agent, or Firm* — Volpe and Koenig, P.C.

(57) ABSTRACT

A system having an SMP connection made among each information processing apparatus in units of a module including a CPU, a main memory, an HDD and the like, allows use of the HDDs distributed in the system as a single disk. The SMP connection is made among information processing apparatuses each including one or more CPUs, a main memory, one or more storage devices, and a storage device controller that controls the storage device. The storage device controller in a certain information processing apparatus controls the storage device in the information processing apparatus and the storage device in another information processing apparatus. Each information processing apparatus includes a storage device switch for exclusively switching which of the storage device controller in the information processing apparatus and the storage device controller in another information processing apparatus is connected to the storage device in the information processing apparatus.

7 Claims, 5 Drawing Sheets

(56) References Cited

FOREIGN PATENT DOCUMENTS

| | | | |
|---|---|---|---|
| JP | 2005-228170 A | 8/2005 |
| JP | 2008-242872 A | 10/2008 |
| JP | 2010-009628 A | 1/2010 |
| JP | 2010-079467 A | 4/2010 |
| JP | 2011-526038 A | 9/2011 |

* cited by examiner

| ROLE OF BMC | CONNECTION DESTINATION OF HDD |
|---|---|
| Primary | STORAGE DEVICE CONTROLLER IN SAME INFORMATION PROCESSING APPARATUS (LOCAL) |
| Non-Primary | STORAGE DEVICE CONTROLLER IN EXTERNAL INFORMATION PROCESSING APPARATUS (REMOTE) |

INFORMATION PROCESSING AND CONTROL SYSTEM FOR INTER PROCESSING APPARATUS CONTROL OF STORAGE DEVICES

TECHNICAL FIELD

In a multiprocessor computer system obtained by connecting two or more information processing apparatuses to one another through symmetric multiprocessing (SMP), storage devices (e.g., an HDD and an SSD) distributed in the information processing apparatuses can be connected to a single storage device controller (RAID controller). As a result, the plurality of storage devices distributed in the information processing apparatuses can be used as a single storage device. The present invention relates to such a control system.

BACKGROUND ART

In recent years, every time a company expands its business due to the company growth, the company has been required to improve the processing performance of a server apparatus. Types of means for developing a computing processing performance of a server apparatus of the related art can be roughly categorized into two types, i.e., "scale out" and "scale up."

As represented by a blade server, the scale out method is means for developing a computing processing performance of a server by adding a server module. A set of a CPU, a main memory, an HDD, and an I/O is considered as a set of server modules. The scale out method is effective when many processes which have a slight relevance with each other are present. While there is an advantage that the development is easily possible by adding the server modules, there is a problem that the method may not be adopted when an especially high processing performance, such as a certain degree of batch processing is required.

Alternatively, as represented by a large scale SMP structure, the scale up method is means for developing and improving the processing performance of a server itself by increasing the speed of a processor, adding a processor, and increasing the capacity of a memory. While the scale up method is effective when an especially high processing performance, such as a large scale batch processing is required, there is a problem that the large scale SMP is generally expensive, and huge costs may be incurred when introducing the system and further developing the system after the introduction.

To solve the above problems, PTL 1 describes a technique for an SMP connection among a plurality of blade server modules, and provides a server apparatus that includes, in addition to a scale out type development performance of a blade server system of the related art, a scale up type development performance. Use of this technique allows developing the system by adopting either one of the scale out type and the scale up type, only for capability necessary in a server module unit of the CPU, the main memory, the HDD, and the I/O.

Further, PTL 2 provides a detachable SMP connection device (frontplane) to be mounted on a blade server module in place of wiring of the SMP connection through a backplane in order to realize SMP among server modules.

However, both of PTL 1 and PTL 2 only describe the technique of the SMP connection between CPUs of different server modules. Thus, if the techniques described in PTL 1 and PTL 2 are used to develop the scale up type system, the number of HDDs is increased in a server module unit. As a result, an operation system (OS) cannot recognize the HDDs as a single disk. Therefore, there is a problem that it is difficult to combine HDDs that are included over the server modules to configure RAID, and the HDDs in the system may not be effectively used.

Figure 6:
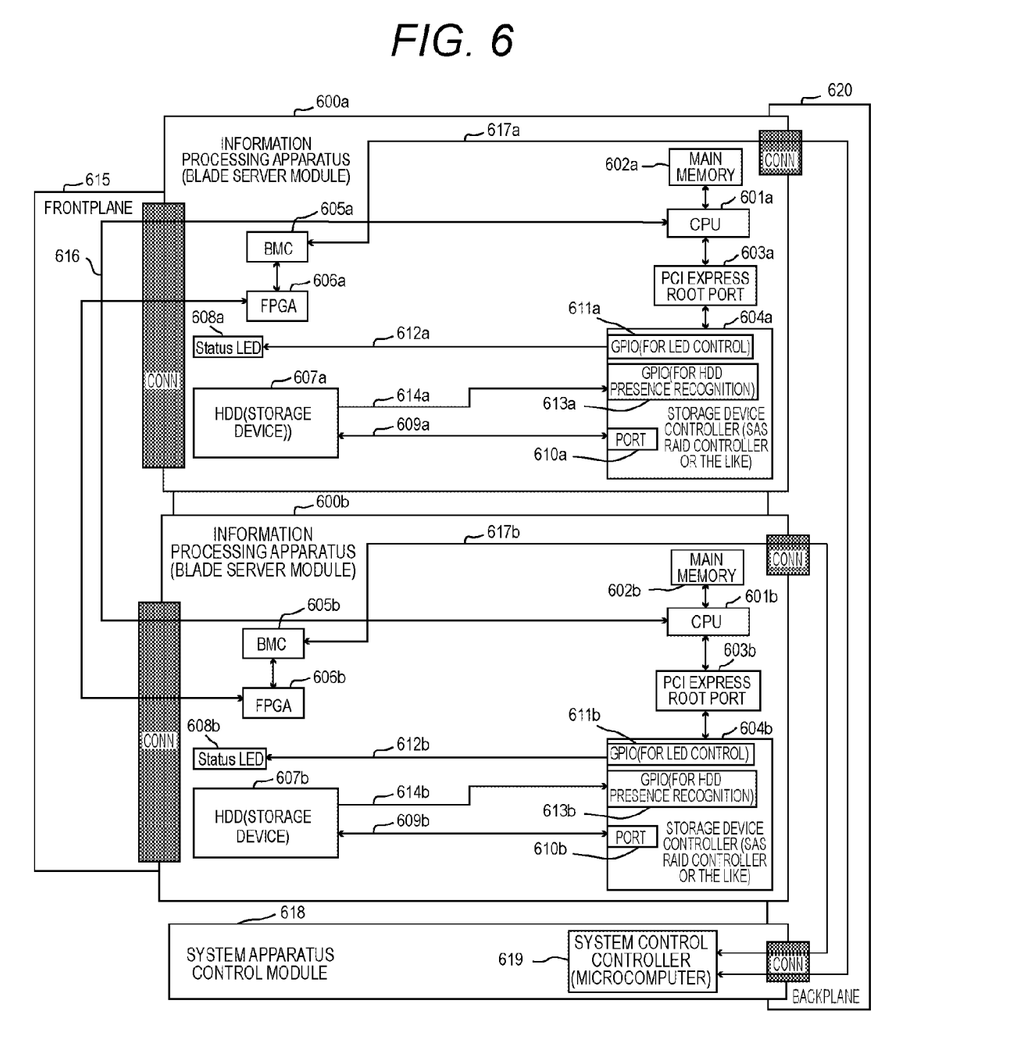
FIG. 6 is a diagram illustrating a general example of the entire hardware configuration of a scale up type information processing system in which an SMP connection is made using the related art.

FIG. 6 illustrates an exemplary system apparatus configured by using the related art.

An information processing apparatus 600a includes a CPU 601a, a main memory 602a, a PCI Express root port 603a, a storage device controller 604a, a board management controller (BMC) 605a, an FPGA 606a, an HDD 607a, and an HDD Status LED 608a that indicates the status of the HDD.

The BMC in the information processing apparatus is connected to a system control controller 619 in a system apparatus control module 618 through a transmission path 617a via a backplane 620.

The HDD 607a in the information processing apparatus is connected to a port 610a for connection with an HDD in the storage device controller 604a through a transmission path 609a.

The storage device controller includes a plurality of input-output terminals represented by a general-purpose input/output (GPIO) pin usable for various purposes depending on setting. As an example, in the storage device controller illustrated in FIG. 6, a purpose of a GPIO 611a is set as an LED control. The GPIO 611a is connected to the Status LED 608a in the information processing apparatus through a sideband signal 612a. Accordingly, an LED that indicates the status of the HDD is controlled.

Similarly, in the storage device controller, a purpose of a GPIO 613a is set as an HDD Presence recognition. The GPIO 613a is connected to the HDD 607a through a sideband signal 614a. Accordingly, the storage device controller recognizes whether the HDD is mounted or not.

A similar information processing apparatus (information processing apparatus 600b) is present. Similarly to the BMC 605a, a BMC 605b in the information processing apparatus 600b is also connected to the system control controller 619 through a transmission path 617b via the backplane.

By connecting a frontplane 615, CPUs (601a and 601b) in the two information processing apparatuses (600a and 600b) are connected to each other through a transmission path 616. Thus, the SMP connection between the CPUs becomes possible. Accordingly, a plurality of information processing apparatuses is capable of operating as a single system apparatus.

On the other hand, the HDD 607a in the information processing apparatus 600a is connected to the storage device controller 604a. Similarly, an HDD 607b in the information processing apparatus 600b is connected to a storage device controller 604b. Therefore, the OS cannot recognize the plurality of HDDs as a single disk.

The example of FIG. 6 illustrates an information processing apparatus mounted with only one HDD. However, there is the following problem with a system in which each of two information processing apparatuses includes two HDDs, and such two information processing apparatuses are combined to configure the SMP. That is, in a current condition, the RAID is configured for each information processing apparatus. Thus, even though four HDDs are present in the system, only RAID0 or RAID1 can be set for each information processing apparatus.

CITATION LIST

Patent Literature

PTL 1: JP 2010-9628 A
PTL 2: JP 2010-79467 A

SUMMARY OF INVENTION

Technical Problem

In a system in which an SMP connection is made among each information processing apparatus in units of a module that includes a CPU, a main memory, an HDD, and an I/O, a plurality of HDDs has been controlled in units of a module in the related art. However, the present invention aims to provide means for controlling the plurality of HDDs from an HDD controller (RAID controller) in a specific module. The means allows using the HDDs distributed in the system as a single disk and effectively using resources in the system.

Solution to Problem

In an information processing system, an SMP connection is made among information processing apparatuses each including one or more CPUs, the main memory, one or more storage devices, and a storage device controller that controls the storage device. In the information processing system, the storage device controller in a certain information processing apparatus controls the storage device in the information processing apparatus and the storage device in another information processing apparatus.

Advantageous Effects of Invention

In the related art, even though two information processing apparatuses each including two HDDs have been combined to configure an SMP, RAID has been configured for each information processing apparatus. Thus, even though the total of HDDs present in the system has been four, only RAID0 or RAID1 has been set for each information processing apparatus. Therefore, reliability has not been ensured with the RAID0. In a case of the RAID1, only half an area has been usable. Thus, resources of the apparatuses have not been effectively used.

However, according to an embodiment of the present invention, in a server system that has a scale up type development performance, HDDs controlled in units of an information system apparatus are allowed to be recognized as a single disk from an OS by connecting a plurality of information processing apparatuses through SMP.

As a result, in a system obtained by combining two information processing apparatuses each including two HDDs to configure the SMP, all the four HDDs are connected to a single RAID controller to allow configuring RAID5 or RAID6. Accordingly, it becomes possible to ensure the reliability and at the same time, effectively use the resources in the apparatuses.

DESCRIPTION OF EMBODIMENTS

Figure 1:
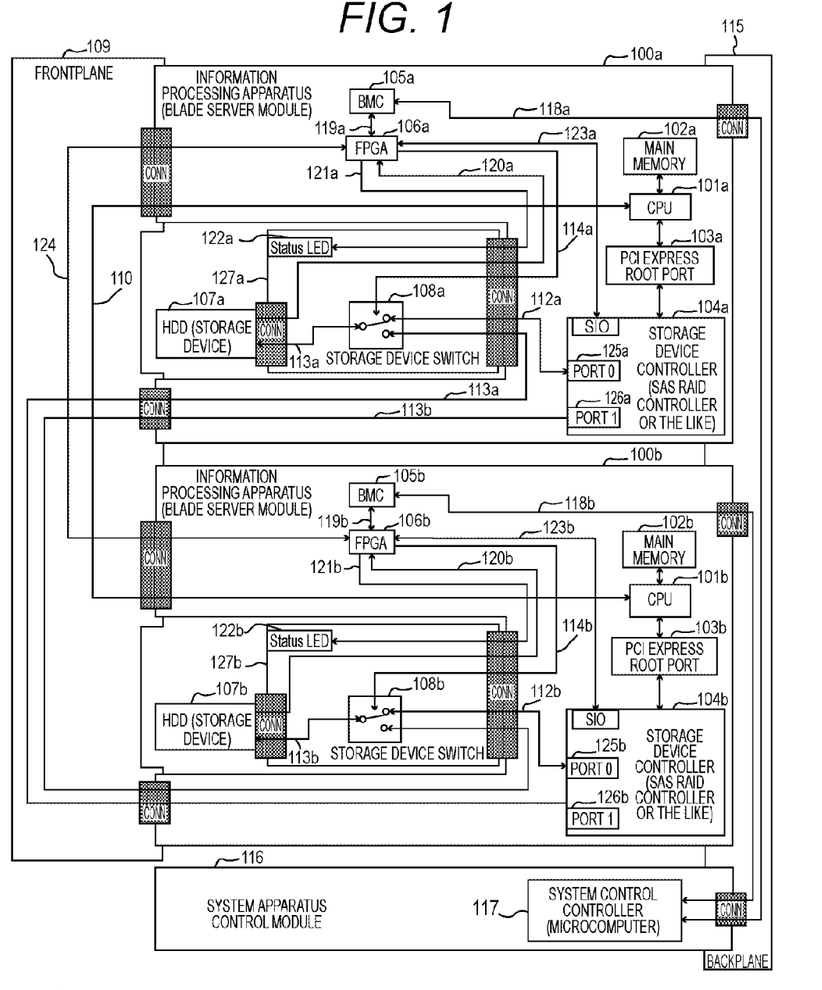
FIG. 1 is a diagram illustrating an exemplary entire hardware configuration of an information processing system that includes a storage device sharing mechanism in an embodiment of the present invention.

FIG. 1 illustrates an exemplary entire configuration of a computer system (blade server system) that uses a storage device control mechanism in an embodiment of the present invention.

An information processing apparatus (blade server module) 100a includes a CPU 101a, a main memory 102a, a PCI Express root port 103a, a storage device controller 104a, a BMC 105a, an FPGA 106a, an HDD 107a, and a daughter card 125a that includes a storage device switch 108a.

The BMC in the information processing apparatus is connected to a system control controller 117 in a system apparatus control module 116 through a transmission path 118a via a backplane 115.

A similar information processing apparatus is present (information processing apparatus 100b). Similarly to the BMC 105a, a BMC 105b in the information processing apparatus 100b is also connected to the system control controller 117 through a transmission path 118b via the backplane.

By connecting a frontplane 109, CPUs (101a, 101b) included in the two information processing apparatuses (100a and 100b) are connected to each other through a transmission path 110.

By connecting the frontplane, a transmission path 113a connects the storage device switch 108a on the daughter card 125a in the information processing apparatus 100a with a port for connection with an HDD (port 1 126b) in a storage device controller 104b included in the information processing apparatus 100b, which is different from the information processing apparatus (100a).

Similarly, the information processing apparatus 100b includes a daughter card 125b on which a storage device switch 108b is provided. By connecting the frontplane, a transmission path 113b connects the storage device switch 108b on the daughter card 125b in the information processing apparatus 100b with a port for connection with an HDD (port 1 126a) in the storage device controller 104a in the information processing apparatus 100a, which is different from the information processing apparatus (100b).

The system control controller 117 can set either one of Primary and Non-Primary for the BMC through the transmission path 118a or 118b.

Generally, each of the BMCs 105a and 105b in the information processing apparatuses 100a and 100b is set to be Primary. Thus, each information processing apparatus functions independently. However, if either one of the BMCs 105a and 105b in the information processing apparatuses 100a and 100*b* interconnected via the frontplane is set to be Primary, and the other BMC is set to be Non-Primary to make the SMP connection between the two information processing apparatuses 100*a* and 100*b*, it becomes possible to use the two information processing apparatuses 100*a* and 100*b* as a single system.

Figure 4:
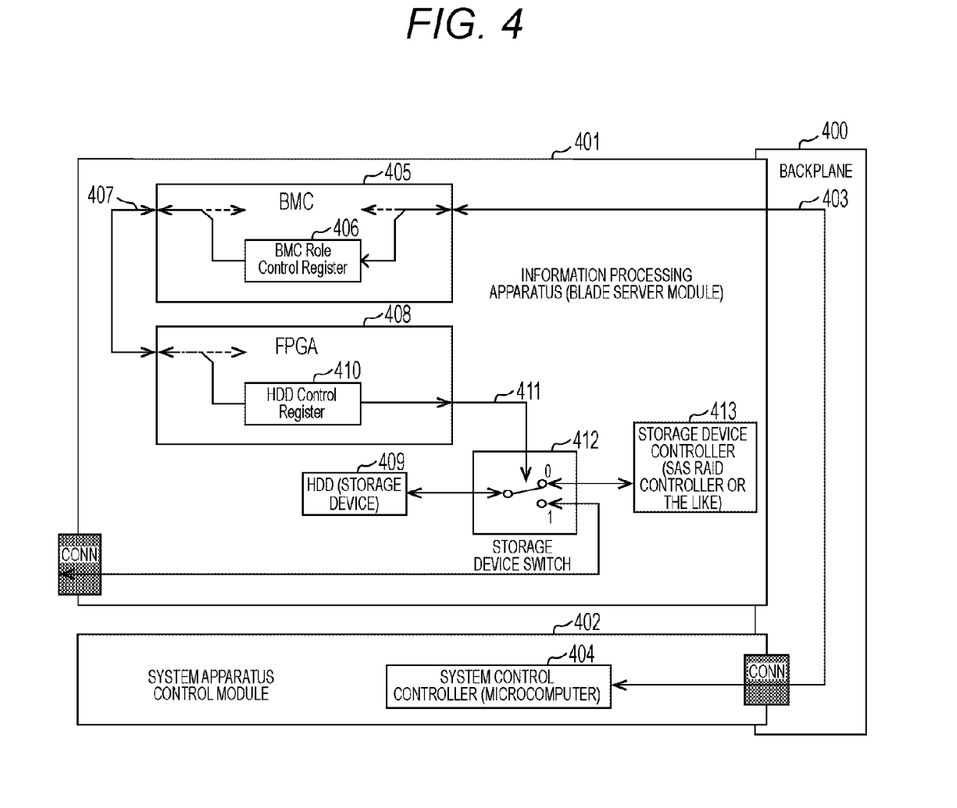
FIG. 4 is a diagram illustrating a flow for a system control controller to set whether the BMC is Primary or Non-Primary according to an embodiment of the present invention.

FIG. 4 illustrates an example of how a system control controller 404 sets Primary/Non-Primary for the BMC.

An information processing apparatus 401 is interconnected, via a backplane 400, with a system apparatus control module 402 that controls an entire system apparatus.

The system control controller 404 is interconnected with a BMC 405 included in the information processing apparatus through a transmission path 403.

The system control controller 404 accesses the BMC 405 though the transmission path 403, whereby hardware in the information processing apparatus 401 is controlled.

The BMC includes a register (BMC Role Control Register 406) for retaining a role of Primary/Non-Primary of the BMC. A value of the register 406 is set by the system control controller 404.

As an example, a system apparatus is obtained by making the SMP connection among a plurality of information processing apparatuses. In the system apparatus, if the information processing apparatus that includes the BMC functions as a main information processing apparatus (Primary) that performs a process of a power-supply control of the system apparatus, the system control controller accesses the BMC though the transmission path 403 and sets a value of the BMC Role Control Register to zero.

Similarly, a system apparatus is obtained by making the SMP connection among a plurality of information processing apparatuses. In the system apparatus, if the information processing apparatus that includes the BMC 405 functions as a dependent information processing apparatus (Non-Primary) that does not control the power-supply by itself, but operates according to an instruction from Primary, the system control controller 404 accesses the BMC 405 though the transmission path 403 and sets a value of the BMC Role Control Register to one.

The BMC refers to the BMC Role Control Register to recognize the role of the information processing apparatus to which the BMC pertains in the system apparatus.

Note that the storage device switch 108*a* illustrated in FIG. 1 has a function of 2:1 multiplexer, and has a function of switching to either one of a signal 112*a* and a signal 113*a*, as a signal to be connected to a signal 111*a* connected to the HDD 107*a*, using a control signal 114*a* from the FPGA 106*a* included in the information processing apparatus 100*a*. The signal 112*a* is from the port for connection with an HDD (port 0 125*a*) in the storage device controller 104*a* included in the information processing apparatus 100*a*. The signal 113*a* is from the port for connection with an HDD (port 1 126*b*) in the rule device controller 104*b* included in the information processing apparatus 100*b* that is different from the information processing apparatus 100*a*.

The FPGA 106*a* included in the information processing apparatus 100*a* is connected to the BMC 105*a* included in the information processing apparatus 100*a* through a transmission path 119*a*. The storage device switch has a function to switch a connection destination of the HDD in the information processing apparatus using the control signal 114*a* from the FPGA 106*a*, according to which of Primary and Non-Primary is set for the BMC.

FIG. 4 illustrates a behavior example of the storage device switch according to the value of the BMC Role Control Register that indicates the role of the BMC.

The BMC 405 included in the information processing apparatus 401 is interconnected with an FPGA 408 included in the information processing apparatus 401 through a transmission path 407.

An HDD Control Register 410 is a register for retaining a control mode of an HDD 409 in the information processing apparatus 401. The FPGA is also included in the information processing apparatus 401, and includes the HDD Control Register 410. According to a value of a BMC Role Control Register 406, the BMC 405 sets a value of the HDD Control Register through the transmission path 407.

As an example, when a role of the BMC is Primary, that is, when a value of the BMC Role Control Register 406 is set to be zero, the BMC sets the value of the HDD Control Register 410 included in the FPGA to be zero through the transmission path 407.

Reversely, when a role of the BMC is Non-Primary, that is, when the value of the BMC Role Control Register 406 is set to be one, the BMC sets the value of the HDD Control Register 410 included in the FPGA 408 to be one through the transmission path 407.

The HDD Control Register 410 is connected to a storage device switch 412 through a control signal 411.

When a value of the control signal 411 is zero, the storage device switch 412 connects the HDD 409 with a storage device controller 413 as illustrated in FIG. 4.

On the other hand, when the value of the control signal 411 is one, the storage device switch 412 switches a destination to be connected.

As a result, by the system control controller 404 setting the role of the information processing apparatus (Primary/Non-Primary), a destination to which the storage device switch is connected can be changed.

Figure 2:
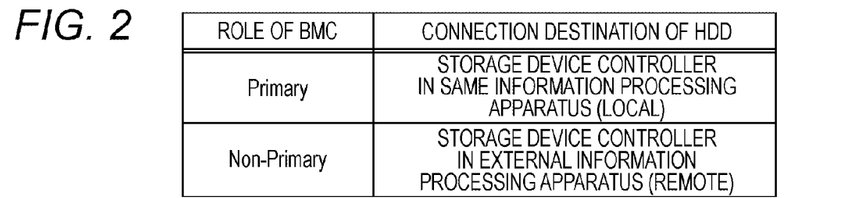
FIG. 2 is a diagram illustrating an exemplary setting table that defines an HDD connection destination per each role (Primary or Non-Primary) of a BMC in a first embodiment of the present invention.

FIG. 2 illustrates an example of a destination to which the HDD is connected depending on a role of the BMC (Primary or Non-Primary).

In this example of FIG. 1, when the role of the BMC 105*a* included in the information processing apparatus 100*a* is set to be Primary, as illustrated by the storage device switch 108*a* included in the information processing apparatus in the figure, the HDD 107*a* included in the information processing apparatus (100*a*) is connected to the storage device controller 104*a* included in the information processing apparatus through the transmission path 112*a*. The HDD (107*a*) and the storage device controller (104*a*) are included in the same information processing apparatus (100*a*), and are connected through the storage device switch (108*a*).

On the other hand, when the role of the BMC 105*b* included in the information processing apparatus 100*b* is set to be Non-Primary, as illustrated by the storage device switch 108*b* included in the information processing apparatus in the figure, an HDD 107*b* included in the information processing apparatus (100*b*) is connected to the port for connection with an HDD (port 1 126*a*) in the storage device controller 104*a* in the information processing apparatus 100*a* through the transmission path 113*b*. The information processing apparatus 100*a* is different from the information processing apparatus (100*b*), and both information processing apparatuses are connected through the frontplane 109. Thus, the HDD 107*b* included in the information processing apparatus (100*b*) is connected to the storage device controller (104*a*) included in the information processing apparatus (100*a*) which is different from the information processing apparatus (100*b*) through the storage device switch (108*b*).

The FPGAs (106*a* and 106*b*) included in the information processing apparatuses (100*a* and 100*b*) are connected to presence sideband signals 120*a* and 120*b* that indicate the presence of the HDD through the daughter cards 125a and 125b. Similarly, the FPGAs (106a and 106b) are also connected to sideband signals for an LED control (121a and 121b) that control the LEDs 122a and 122b that indicate Status of the HDD through the daughter cards 125a and 125b.

The FPGAs (106a and 106b) are connected to the storage device controllers (104a and 104b) through SIO interfaces 123a and 123b.

Alternatively, the FPGA 106a included in the information processing apparatus 100a is connected to an FPGA 106b included in the information processing apparatus 100b through a transmission path 124. The information processing apparatus 100a and the information processing apparatus 100b are connected via the frontplane 109.

Figure 3:
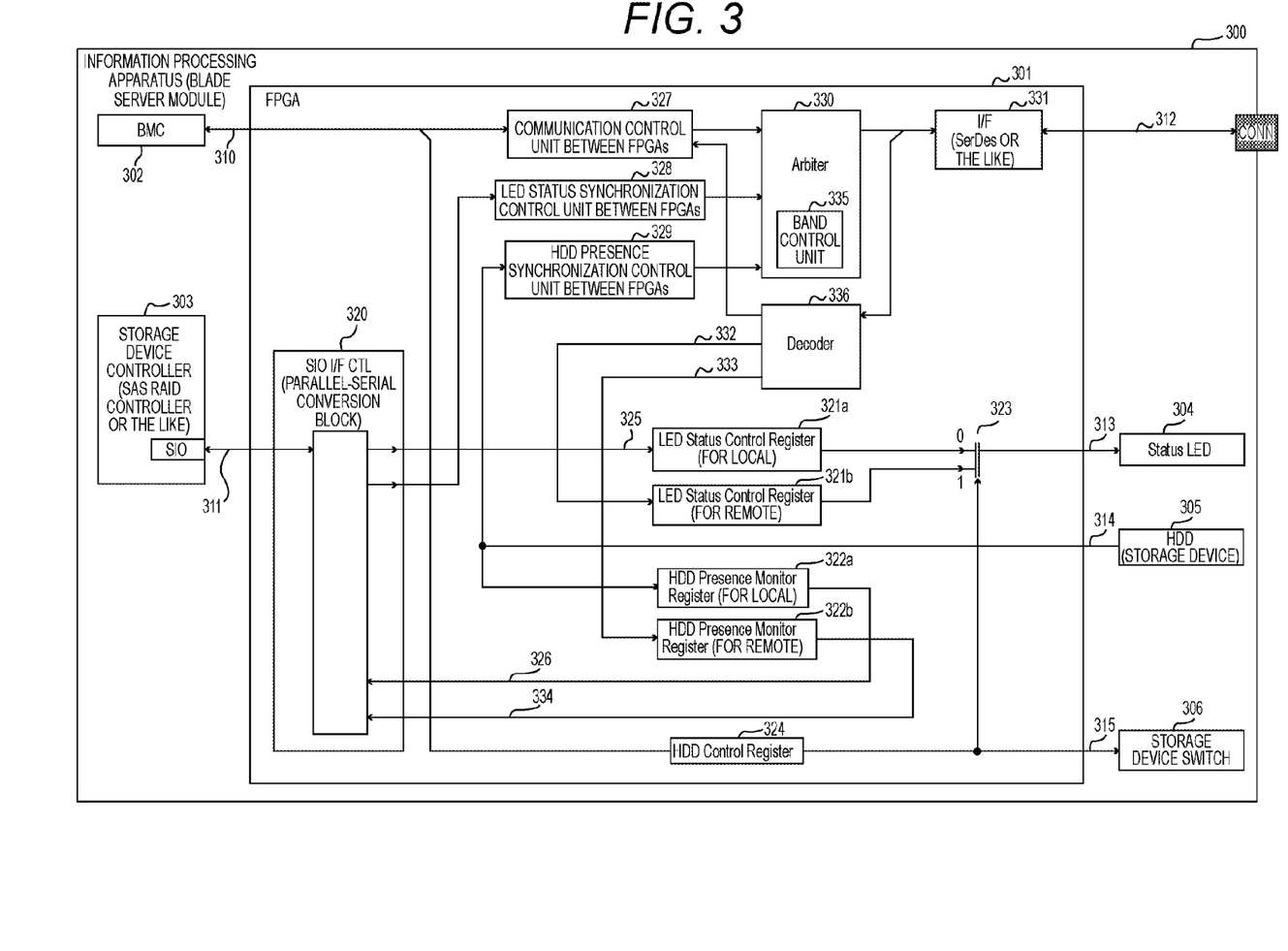
FIG. 3 is a diagram illustrating one example in which an FPGA is realized according to the first embodiment of the present invention.

FIG. 3 illustrates an example in which the FPGA according to an embodiment of the present invention is implemented.

In FIG. 3, an FPGA 301 is positioned inside an information processing apparatus 300. The FPGA is connected to a BMC 302 through a transmission path 310 and also connected to a storage device controller 303 through a transmission path 311. A sideband signal 314 that indicates the presence of the HDD connects an HDD 305 and inside the FPGA. A sideband signal 313 connects a Status LED 304 that indicates the status of the HDD with inside the FPGA.

The FPGA 301 is connected to a storage device switch 306 included in the information processing apparatus through a control signal 315. As illustrated in the example of FIG. 1, a plurality of information processing apparatuses is connected via a frontplane 109. In such a condition, a communication transmission path 312 between FPGAs is used for communication between an FPGA in a different information processing apparatus (hereinafter referred to as a remote apparatus) and the FPGA in the information processing apparatus (hereinafter referred to as a local apparatus). The FPGA 301 is connected to the communication transmission path 312 between FPGAs and also connected to the FPGA of the remote apparatus via the frontplane 109.

The FPGA 301 includes a register (HDD Control Register 324) for managing an HDD control mode, and is controlled by the BMC 302 through the transmission path 310 connected to the BMC.

If the information processing apparatus (local apparatus) that includes the BMC 302 operates as Primary and if HDDs in the local apparatus are controlled by a storage device controller in the local apparatus, the BMC 302 sets a value of the HDD control mode register 324 to zero.

Reversely, if the information processing apparatus (local apparatus) that includes the BMC operates as Non-Primary and if HDDs in the local apparatus are controlled by a storage device controller in a different information processing apparatus (remote apparatus), the BMC sets a value of the HDD control mode register 324 to one.

A transmission path 311 for connecting the FPGA 301 and the storage device controller 303 connects an SIO (Serial I/O) included in the storage device controller 303 and an SIO I/F CTL (parallel-serial conversion block) 320 included in the FPGA 301. The SIO I/F CTL converts a serial control signal from the storage device controller 303 to a parallel signal and is connected to a register included in the FPGA.

The FPGA 301 includes an LED Status Control Register (for the local apparatus) 321a for controlling an LED that indicates Status of the HDD included in the local apparatus. The register is connected to the storage device controller 303 via the SIO I/F CTL 320 by use of a signal 325. Further, the register is connected to the Status LED 304 via a selector 323. The selector 323 is controlled by a signal 315 for controlling the storage device switch. When a value of the signal 315 for controlling the storage device switch is zero, the LED Status Control Register (for the local apparatus) 321a and the Status LED 304 are connected, thereby allowing the storage device controller 303 to control the Status LED 304 for the local apparatus.

The FPGA 301 includes an HDD Presence Monitor Register (for the local apparatus) 322a that is connected to a sideband signal 314 that indicates the presence of the HDD included in the local apparatus. The register is connected to the SIO I/F CTL 320 through a signal 326, thereby allowing the storage device controller 303 to detect the presence of the HDD 305 included in the local apparatus.

Alternatively, the FPGA includes an LED Status synchronization control unit between FPGAs 328. The LED Status synchronization control unit between FPGAs 328 receives, as an input signal, a signal for controlling an LED of the remote apparatus output from the storage device controller 303 through the SIO I/F CTL 320.

The sideband signal 314 that indicates the presence of the HDD in the local apparatus is connected to the HDD Presence Monitor Register 322a and additionally to an HDD Presence synchronization control unit between FPGAs 329 included in the FPGA 301.

The synchronization control unit latches the Presence signal 314 from the HDD included in the local apparatus and retains a value of the signal.

It is assumed that when an HDD is mounted, a value of the Presence signal 314 is zero (Low), and when the HDD is not mounted, a value of the Presence signal 314 is one (High). If the HDD is mounted, the HDD Presence synchronization control unit latches the value zero, and if the HDD is not mounted, the HDD Presence synchronization control unit latches the value one.

The FPGA 301 includes an Arbiter 330 and arbitrates three signals. A first signal is from a communication control unit between FPGAs 327 that is used to manage the FPGAs in the local apparatus and the remote apparatus by the BMC 302 and used to control the communication between the FPGAs. A second signal is from the LED Status synchronization control unit between FPGAs 329. A third signal is from the HDD Presence synchronization control unit between FPGAs.

An output signal from the Arbiter 330 is transmitted to the FPGA in the remote apparatus through an I/F 331 such as SerDes and a transmission path 312 for connecting the FPGA in the local apparatus with the FPGA in the remote apparatus.

Further, the Arbiter 330 includes a band control unit 335 for controlling the bands of a signal from the communication control unit between FPGAs 327, a signal from the LED Status synchronization control unit between FPGAs 328, and a signal from the HDD Presence synchronization control unit between FPGAs 329.

The band control unit 335 has a function of outputting, at a constant interval to the I/F 331 such as the SerDes, a signal from the LED Status synchronization control unit between the FPGAs 328. Thus, the output signal from the LED Status synchronization control unit between the FPGAs 328 is ensured to be transferred to the FPGA in the remote information processing apparatus within a predetermined period of time.

Similarly, the band control unit 335 has a function of outputting, at a constant interval to the I/F 331 such as the SerDes, a signal from the HDD Presence synchronization control unit between the FPGAs 329. Thus, the output signal from the HDD Presence synchronization control unit between the FPGAs 329 is ensured to be transferred to the FPGA in the remote information processing apparatus within a predetermined period of time.

The FPGA 301 also includes a Decoder 336 for decoding a signal transmitted from the FPGA in the remote apparatus.

The Decoder 336 has a function of decoding a signal transmitted from the FPGA in the remote apparatus into a signal from the communication control unit between FPGAs, a signal from the LED Status synchronization control unit between FPGAs 328, and a signal from the HDD Presence synchronization control unit between FPGAs 329 inside the FPGA in the remote apparatus.

The signal from the LED Status synchronization control unit between FPGAs transmitted from the FPGA in the remote apparatus is obtained by means of the decoder 336. The obtained signal is connected to the LED Status Control Register (for the remote apparatus) 321b in the FPGA 301 through a signal 332, and a value of the signal is registered.

The register 321b is connected to the Status LED 304 via a selector 323. When a value of the signal 315 for controlling the storage device switch is one, the LED Status Control Register (for the remote apparatus) 321b and the Status LED 304 are connected. Accordingly, the Status LED 304 in the local apparatus can be controlled by the storage device controller in the remote apparatus.

Similarly, the signal from the HDD Presence synchronization control unit between FPGAs transmitted from the FPGA in the remote apparatus is obtained by means of the decoder. The obtained signal is connected to the HDD Presence Monitor Register (for the remote apparatus) 322b in the FPGA 301 through a signal 333, and a value of the signal is registered.

The register is connected to the SIO I/F CTL 320. Therefore, the storage device controller in the local apparatus is allowed to detect the presence of the HDD 305 in the remote apparatus.

As a result, by adopting the present technique, in the SMP system obtained by connecting a plurality of information processing apparatuses to one another, each HDD in each different information processing apparatus can be connected to a storage device controller in a specific information processing apparatus. A storage device controller in the local apparatus can detect whether the HDD is mounted or not in the remote apparatus, and accordingly, the storage device controller in the local apparatus can control an LED that indicates a condition of the HDD in the remote apparatus.

Thus, it becomes possible for an operating system to use HDDs in different information processing apparatuses as a single storage device (Disk).

Figure 5:
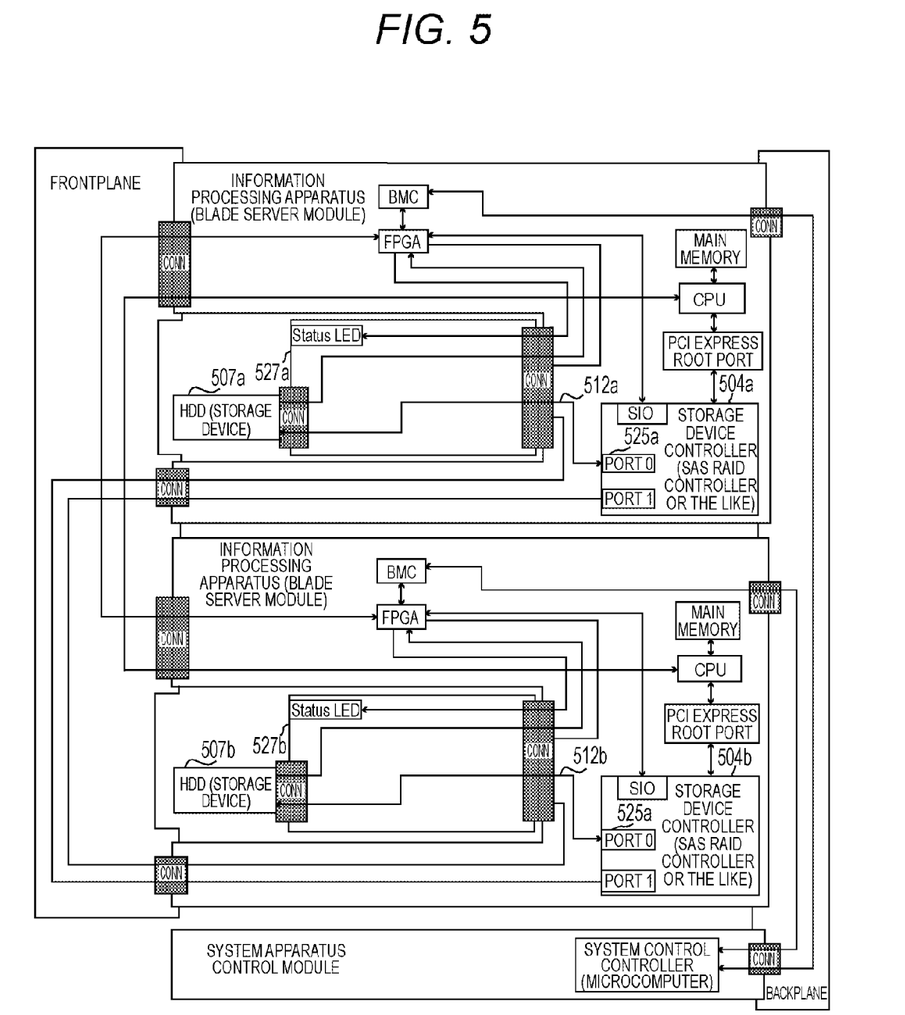
FIG. 5 is a diagram illustrating an exemplary entire hardware configuration in the information processing system when a daughter card that does not include a storage device switch is used in the system configuration of FIG. 1.

FIG. 5 exemplifies daughter cards 527a and 527b each of which does not include a storage device switch. The daughter cards are connected to HDDs 507a and 507b and connected to ports 525a and 525b for connection with HDDs included in storage device controllers 504a and 504b through transmission paths 512a and 512b, respectively. If a user does not require a storage device sharing mechanism according to an embodiment of the present invention, by use of the daughter cards illustrated in FIG. 5, the user can directly connect an HDD to a storage device controller. Further, by switching the daughter cards while using the same information processing apparatus, the user can reduce an introduction cost of the system depending on a use purpose of the user.

REFERENCE SIGNS LIST 100a to 100b information processing apparatus
101a to 101b CPU
102a to 102b main memory
104a to 104b storage device controller
105a to 105b BMC
106a to 106b FPGA
107a to 107b HDD
108a to 108b storage device switch
109 frontplane
115 backplane
116 system apparatus control module
117 system control controller
127a to 127b daughter card including storage device switch
300 information processing apparatus
301 FPGA
302 BMC (Board Management Controller)
303 storage device controller
304 HDD Status LED
305 HDD
306 storage device switch
320 SIO I/F Controller (CTL)
321a LED Status Control Register for local information processing apparatus
321b LED Status Control Register for remote information processing apparatus
322a HDD Presence Monitor Register for local information processing apparatus
322b HDD Presence Monitor Register for remote information processing apparatus
323 selector
324 register (HDD Control Register) for managing HDD control mode
327 communication control unit between FPGAs
328 HDD LED Status synchronization control unit between FPGAs
329 HDD Presence synchronization control unit between FPGAs
330 Arbitor
331 I/F (SerDes)
336 Decoder
400 backplane
401 information processing apparatus
402 system apparatus control module
404 system control controller
405 BMC
406 register (BMC Role Control Register) for managing role of BMC
408 FPGA
409 HDD
410 register (HDD Control Register) for managing HDD control mode
412 storage device switch
413 storage device controller
504a to 504b storage device controller
507a to 507b HDD
527a to 527b daughter card
600a to 600b information processing apparatus
601a to 601b CPU
602a to 602b main memory
604a to 604b storage device controller
605a to 605b BMC
606a to 606b FPGA
607a to 607b HDD
608a to 608b storage device switch
615 frontplane
618 system apparatus control module
619 system control controller
620 backplane

The invention claimed is:
1. An information processing system comprising:
a first information processing apparatus comprising:
a first central processing unit CPU;
a first main memory coupled to the first CPU, a first Peripheral Component Interconnect (PCI) Express root port coupled to the first CPU;
a first storage device; and
a first storage device controller coupled to the first PCI Express root port;
a second information processing apparatus comprising:
a second CPU;
a second main memory coupled to the second CPU,
a second PCI Express root port coupled to the second CPU;
a second storage device; and
a second storage device controller coupled to the second PCI Express root port; and
a symmetric multiprocessing (SMP) connection apparatus coupled to the first CPU and the second CPU without connecting to the first PCI Express root port and the PCI Express root port, the SMP connection apparatus configured to form a SMP connection between the first CPU and the second CPU,
wherein the first information processing apparatus further comprises a first storage device switch coupled to the first storage device controller and the first storage device, the first storage device switch coupled to the second storage device controller via the SMP connection apparatus, and
wherein the first storage device is coupled to the first storage device controller or the second storage device controller exclusively.

2. The information processing system according to claim 1, wherein the second information processing apparatus further comprises a second storage device switch coupled to: (i) the second storage device controller and the second storage device; and the first storage device controller via the SMP connection apparatus,
wherein the second storage device is connected exclusively coupled to the first storage device controller or exclusively coupled to the second storage device controller.

3. The information processing system according to claim 1 wherein the first storage device switch is mounted on a daughter card.

4. The information processing system according to claim 3, wherein
the system controller is configured to set: (i) the first information processing apparatus as a main information processing apparatus using a first register in the first information processing apparatus; or (ii) the second information processing apparatus as the main information processing apparatus using a second register in the second information processing apparatus,
if the first register indicates that the first information processing apparatus is set as the main information processing apparatus and the second register does not indicate that the second information processing apparatus is set as the main information processing apparatus, the first storage device switch exclusively couples the first storage device to the first storage device controller, and the second storage device switch exclusively couples the second storage device to the first storage device controller, and
if the second register indicates that the second information processing apparatus is set as the main information processing apparatus and the first register does not indicate that the first information processing apparatus is set as the main information processing apparatus, the first storage device switch exclusively couples the first storage device to the second storage device controller, and the second storage device switch exclusively couples the second storage device to the second storage device controller.

5. The information processing system according to claim 4, wherein each of the first CPU and the second CPU executes in a common operating system which recognizes the first storage device and the second storage device.

6. The information processing system according to claim 5, wherein the first information processing apparatus and the second information processing apparatus comprise status LEDs configured to indicate that the first information processing apparatus or the second information processing apparatus is the main information processing apparatus.

7. The information processing system according to claim 1, further comprising:
a system controller configured to control the information processing system; and
a connection plane connected to the first information processing apparatus, the second information processing apparatus and the system controller,
wherein the connection plane is different than the SMP connection apparatus.

\* \* \* \* \*